(12) United States Patent
Webb (10) Patent No.: US 6,366,647 B1
(45) Date of Patent: Apr. 2, 2002

(54) ALARM REPORT CALL REROUTER

(76) Inventor: Richard S Webb, 292 Texas Dr., Brick, NJ (US) 08723

( * ) Notice: Subject to any disclaimer, the term of this patent is extended or adjusted under 35 U.S.C. 154(b) by 0 days.

(21) Appl. No.: 09/304,036

(22) Filed: May 3, 1999

(51) Int. Cl.[7] .............................................. H04M 11/00
(52) U.S. Cl. ................................... 379/40; 379/106.08
(58) Field of Search ............................... 379/37, 39–40, 379/42–44, 46–47, 49–51, 93.01, 106.08, 210–213, 221, 355–356, 379, 33, 106.03, 106.11

(56) References Cited

U.S. PATENT DOCUMENTS

| | | | |
|---|---|---|---|
| RE27,138 E | | 6/1971 | Glidden |
| 4,317,964 A | * | 3/1982 | Biggs et al. ................. 379/379 |
| 4,887,290 A | | 12/1989 | Dop et al. ..................... 379/33 |
| 4,905,273 A | * | 2/1990 | Gordon et al. ........... 379/93.01 |
| 5,134,644 A | * | 7/1992 | Garton et al. ................. 379/39 |
| 5,517,547 A | | 5/1996 | Ladha et al. .................. 379/40 |
| 5,684,858 A | | 11/1997 | Hartmann et al. ............ 379/40 |
| 5,862,201 A | * | 1/1999 | Sands .......................... 379/37 |
| 5,943,394 A | * | 8/1999 | Ader et al. ................... 379/40 |
| 6,081,546 A | * | 6/2000 | Williamson et al. .......... 379/40 |

* cited by examiner

*Primary Examiner*—Curtis Kuntz
*Assistant Examiner*—George Eng
(74) *Attorney, Agent, or Firm*—Kenneth Watov; Watov & Kipnes, P.C.

(57) ABSTRACT

A device for rerouting the report call of an alarm system to another telephone number through the interruption of the alarm system's out-dialing process, includes two electronically controlled switching devices that allow the device to momentarily isolate the alarm from the phone line. Switches are operated under microprocessor control, for causing dialing of the new phone number by the generation of DTMF tones by a DTMF generator operating under microprocessor control. Triggering of the report call rerouting process is keyed to the presence of two conditions: one being loss of voltage from the handset lines, and the other being presence of dialing activity, either DTMF tones or pulse-dialing pulses on the telephone line. The device will reset itself after the telephone has been held in the on-hook condition for a predetermined interval by the alarm system, to allow the device to reroute subsequent report call attempts if initial attempts to connect are unsuccessful.

12 Claims, 10 Drawing Sheets

ALARM REPORT CALL REROUTER

FIELD OF THE INVENTION

The invention relates generally to security systems, and more particularly to security systems which communicate with a central monitoring station via a telephone line.

BACKGROUND OF THE INVENTION

Present day security systems (i.e. intrusion and/or fire alarm systems) typically include a telephone dialer which is coupled to the alarm system and to a telephone line at the protected premises. When an alarm system is "tripped" (i.e. intrusion, fire), the alarm system dials the telephone number of a central monitoring station. Upon answering by the central monitoring station, the alarm system transmits information to the central monitoring station so that police and/or firefighters may be dispatched to the protected premises. Many of the alarm systems' telephone dialers are typically limited to the telephone number programmed by the vendor or installer. Therefore, users of such alarm systems are limited in choosing their central monitoring service provider.

SUMMARY OF THE INVENTION

An object of the invention is to provide a method and apparatus for rerouting the report call of an alarm system to a telephone number different from the preprogrammed one.

It is a further object of the invention to provide the user of the alarm system an option to choose any desired central monitoring station service provider without having to program the alarm system itself.

With these and other objects in mind, the present invention provides for a detector means for sensing both the voltage drop across a telephone handset line and the presence of dialing activity from the alarm system, whereupon it generates initiating signals to a microprocessor controller. When the microprocessor controller receives the initiating signals, it outputs both a switching signal and a preprogrammed dialing signal. A switching means responsive to the switching signal returns the telephone line briefly to an on-hook condition to reestablish dial tone and isolates the alarm system from the telephone line during the rerouting process. Upon reestablishing dial tone, a telephone communication dialer means responsive to the dialing signal, dials the telephone number of the desired central monitoring station. Once the dialing is complete, the alarm system is reconnected to the telephone line for data transfer to the central monitoring station.

BRIEF DESCRIPTION OF THE DRAWINGS

Various embodiments of the present invention are described below with reference to the drawings, in which like items are identified by the same reference designation, wherein.

DETAILED DESCRIPTION OF THE INVENTION

Figure 1:
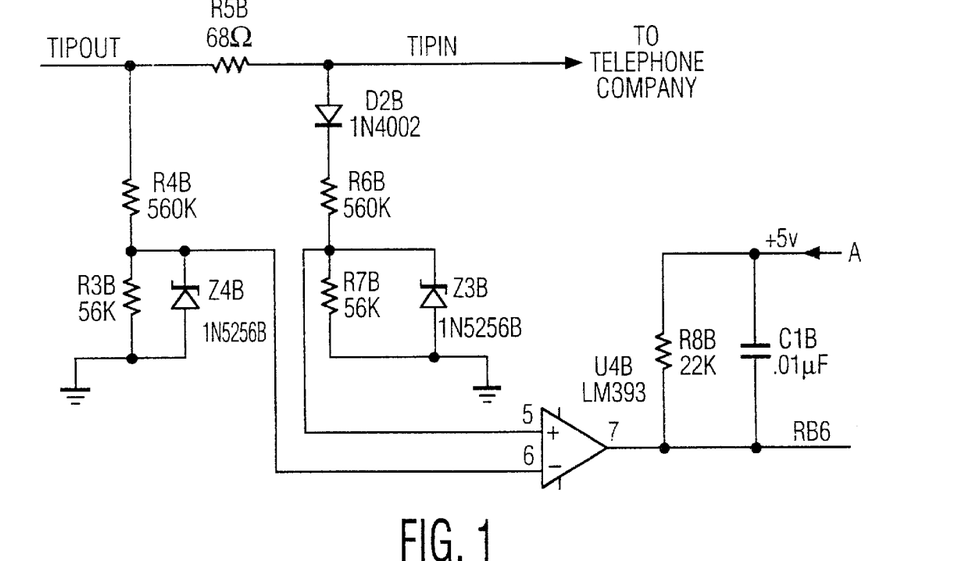
FIGS. 1–7 collectively shows a detailed circuit schematic diagram of various components of the present invention.
Figure 1A:
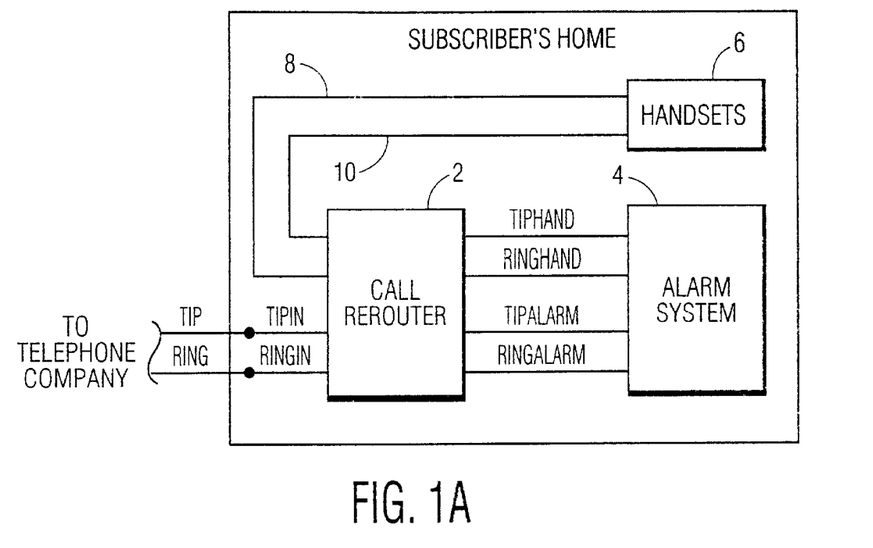
FIG. 1A shows a simplified block diagram indicating the major components of an alarm system incorporating therein the alarm report rerouting system of the present invention.

FIG. 1A depicts the placement and connection of the alarm report call rerouter in a subscriber's home alarm system. The TIP and the RING of the telephone company are connected respectively to the TIPIN and the RINGIN of the call rerouter 2. The call rerouter 2 is then connected to the alarm system 4 by the loop pair TIPALARM and RINGALARM. The call rerouter 2 is also connected to the alarm system 4 by the loop pair TIPHAND and RINGHAND which corresponds to event detection on the handset 6 lines 8, 10.

In FIG. 1, reference label TIPIN designates the tip (more positive conductor) of the local loop conductor pair as it enters the subscriber's home from the telephone company. The local loop current passes through a small resistor (R5B, 68 OHM in the preferred embodiment). The local loop current level can be measured from the voltage drop across R5B. Resistors R3B and R4B form a voltage divider network that attenuates the TIPOUT voltage signal by a fixed ratio. Thus the voltage delivered to the inverting input of Comparator U4B will be $\frac{1}{11}^{th}$ of the original voltage. Resistors R6B and R7B form a voltage divider network with an identical ratio of attenuation. This network attenuates the TIPIN voltage signal, less 0.7V (volt) due to the presence of diode D2B. This attenuated signal is applied to the noninverting input of Comparator U4B. The purpose of the twin dividers is to bring the common mode of the two signals being compared down into the common mode range of comparator U4B. Zener diodes Z3B and Z4B protect the inputs of the comparator U4B from exceeding the absolute maximum rating of the device in the event that high voltage transients appear on the local loop conductor pair. Resistor R8B is a pull-up resistor to hold the open-drain output of the comparator U4B high to produce a logic high state, typically designated as a digital "1". Capacitor C1B prevents RF oscillation due to any coupling between comparator U4B inputs and its output that might occur in the associated printed-circuit layout.

Given that the comparator U4B will change logic state when the voltage present on the inverting input equals the voltage on the non-inverting input, and that the TIPIN signal is always disadvantaged by 0.7V due to the presence of D2B, the TIPIN signal must always be 0.7V more positive than TIPOUT at the point of comparator logic state transition. For the component values given in the preferred embodiment, this corresponds to a loop current of approximately 10 mA (milliampere). Given that typical local loop currents for the off-hook state range from 20 mA–120 mA, and are typically less than 6 mA in the on-hook state, the above circuit can reliably discern between the on-hook and off-hook line conditions, producing a logic high output when loop current is present and logic low output (typically digital "0") when the line is on-hook. It is this circuit that allows pulse-dialing detection capability as well as on-hook/off hook discrimination in the preferred embodiment of the invention.

Figure 2:
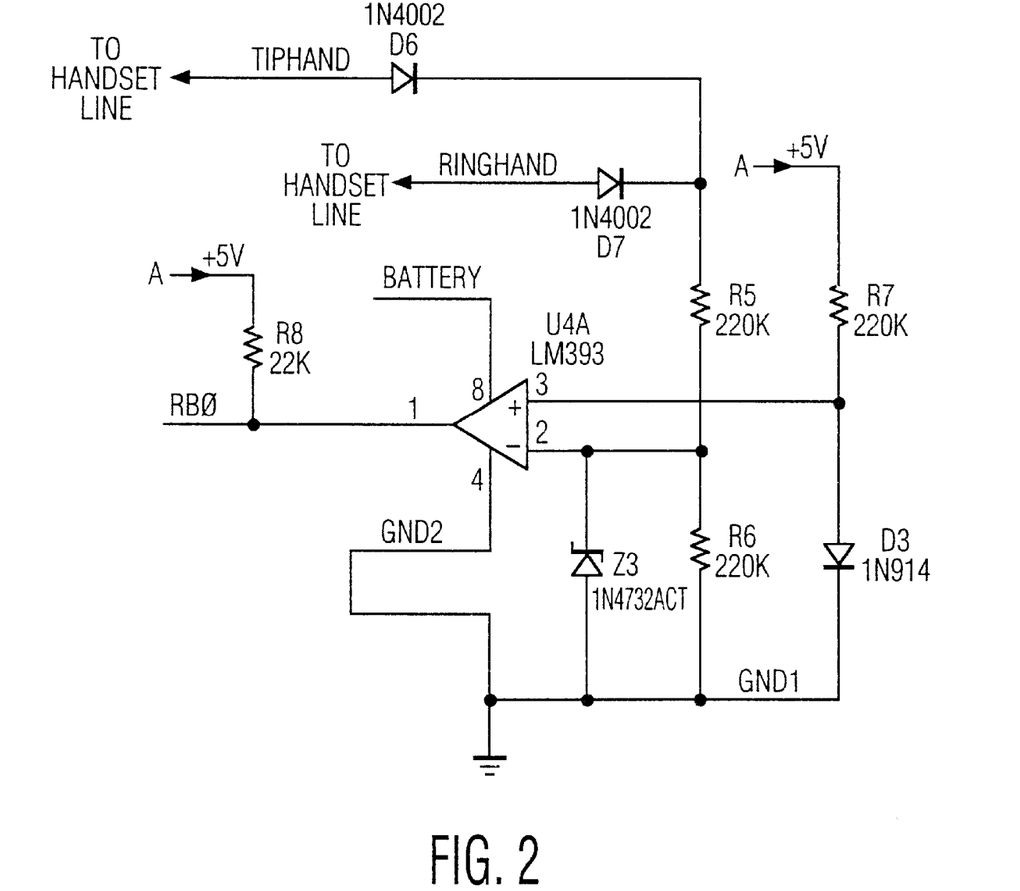

Reference label TIPHAND from FIG. 2 designates the tip (more positive conductor) of the handset 6 conductor pair 8,10. The handset 6 conductor pair 8,10 emerges from the alarm system 4 and continues on to connect to the subscriber's telephones. Reference label RINGHAND designates the ring (more negative conductor) of the handset 6 conductor pair 8,10. Diodes D6 and D7 are arranged such that the junction of their cathodes will be at a voltage equal (less a 0.7V diode drop) to the more positive of these two signals. This allows normal operation of the circuit even in the case where improper wiring at the alarm system 4 has resulted in the reversal of electrical polarity in the handset 6 conductor pair 8,10. Resistors R5 and R6 form a voltage divider network that attenuates the resulting signal by a fixed ratio.

Thus the instantaneous voltage delivered to the inverting input of Comparator U4A will be ½ of the original signal level for original voltages in the range of approximately 0V–10V. When the input to the divider network exceeds 10V, Zener diode Z3 begins a clamping action that holds the voltage of the inverting input of the comparator substantially constant at the rated Zener voltage (4.7V in the preferred embodiment). Diode D3 and resistor R7 are used to establish a reference voltage of approximately 0.5V, which develops on the anode of D3 and is supplied to the non-inverting input of the comparator U4A. Resistor R8 is a pull-up resistor to hold the open-drain output of the comparator U4B high to produce the logic high state "1".

Given that the comparator U4A will change logic state when the voltage present on the inverting input equals the voltage on the non-inverting input, this corresponds to a line voltage of 1V. Thus, this circuit is useful for discriminating between normal operating line voltages (where even in the worst case line voltages never fall below 1V) and the case in which handset tip and ring conductors have been galvanically isolated from the local loop (in which case 0V develops on the inverting input of the comparator U4A). Such galvanic isolation occurs when a typical alarm system 4 activates, so that household telephones will not disrupt the report call process. Thus this circuit can signal the activation of the alarm system 4, giving a logic high output "1" during alarm system 4 activation, and logic low output "0" while in normal operation.

Figure 3:
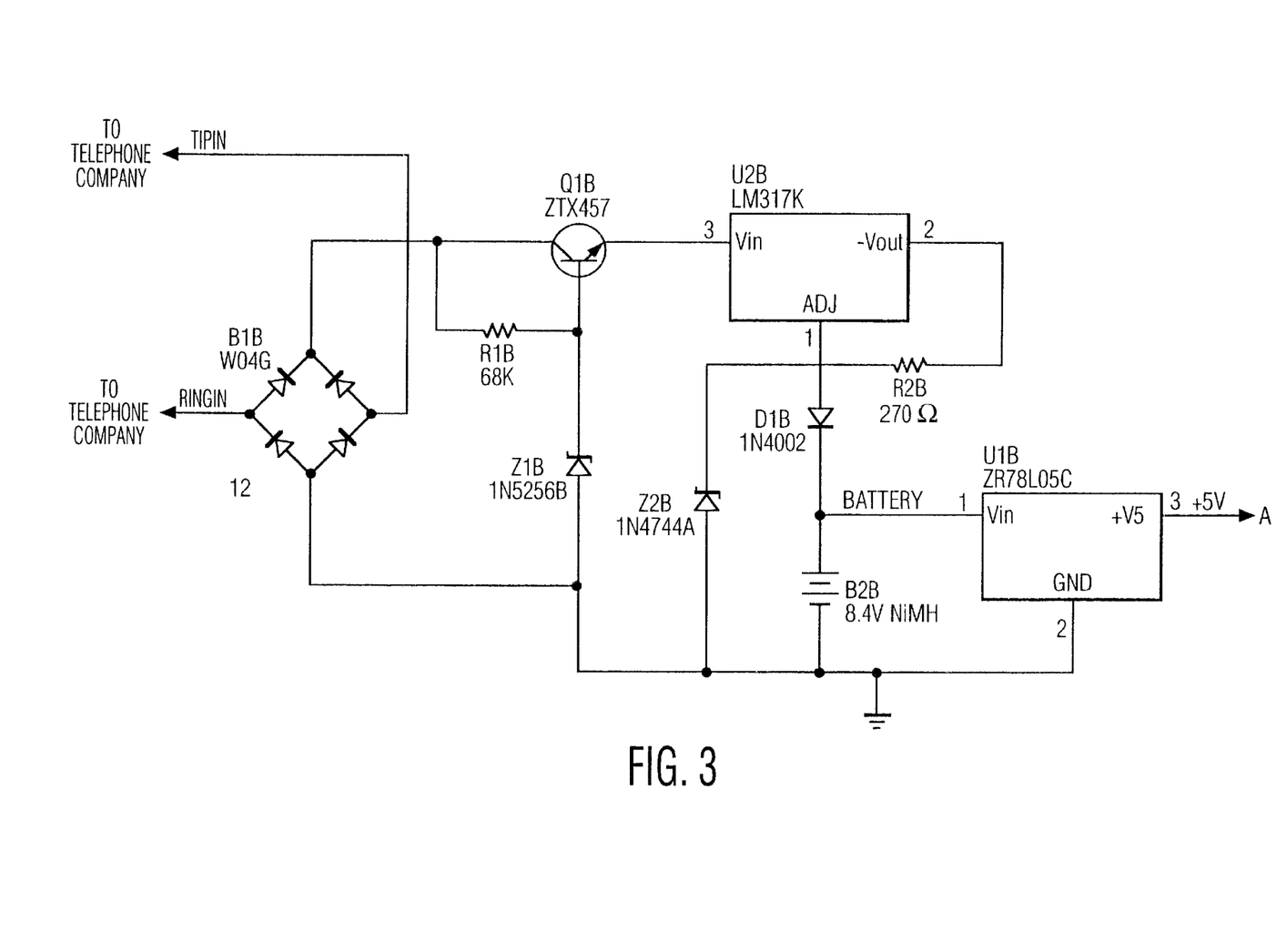

FIG. 3 depicts a battery charger and power supply circuit of the present invention. Reference labels TIPIN and RINGIN designate the tip and ring, respectively, of the local loop conductor pair directly as it enters the subscriber's home from the telephone company. The conductor pair enters bridge rectifier B1B, which protects the battery charging circuitry against accidental tip-ring reversal. The positive tap of the bridge rectifier 12 supplies the input to the series voltage regulator formed by Q1B, resistor R1B, and Zener diode Z1B. This regulator holds the output at the voltage rating of the Zener diode Z1B (30V in the preferred embodiment). The high voltage rating of Q1B (300V in the preferred embodiment) protects the components of the battery charging system from ring signal voltages and transients on the local loop conductor pair. The output voltage of the serial regulator supplies the current source formed by U2B and resistor R2B. This current source supplies a substantially constant current (in the preferred embodiment, approx. 5.5 mA) used to charge battery B2B and supply standby current to the quiescent circuitry. Battery charging current is typically 3.5 mA in the preferred embodiment, with the balance of current going toward quiescent consumption. Diode D1B protects against battery B2B discharge through the charging system in the event the telephone line connection is removed and the battery remains installed. Zener diode Z2B prevents the charging system from producing excessive voltage output in the event the battery B2B is removed and the telephone line connection remains (output will be clamped at 15V in the preferred embodiment). Regulator U1B supplies a constant voltage (5V in the preferred embodiment) independent of the fluctuations in battery voltage associated with charging and discharging.

Figure 4:
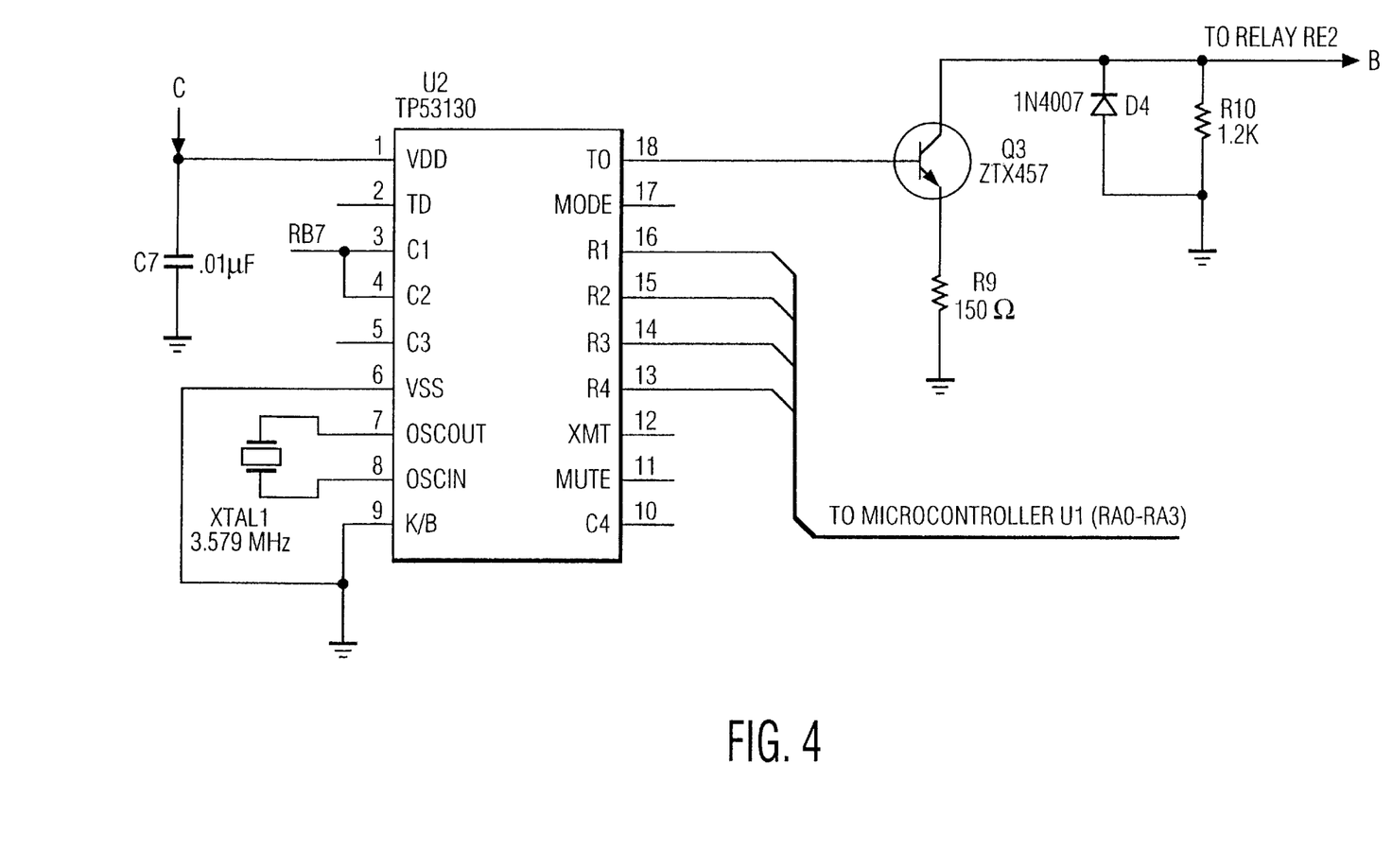

FIG. 4 depicts the dialing circuitry. As the tone generator IC chip U2 in FIG. 4 is a commercial device, it will not be described in detail here. External components have been included as per the manufacturer's application notes. A bus of four conductors interconnects four output pins of the microcontroller U1 in FIG. 7 with four tone selection input pins (R1–R4) of the tone generator IC chip U2 in FIG. 4. Each permutation of this four bit binary word represents a unique DTMF tone to be generated. Transistor Q3 and resistor R9 interface the output of the tone generator to the telephone line. Diode D4 protects Q3 as well as the TO output of U2 from negative-going transients on the tip conductor of the local loop pair. Resistor R10 draws sufficient current to keep the phone line in the off-hook condition.

Figure 5:
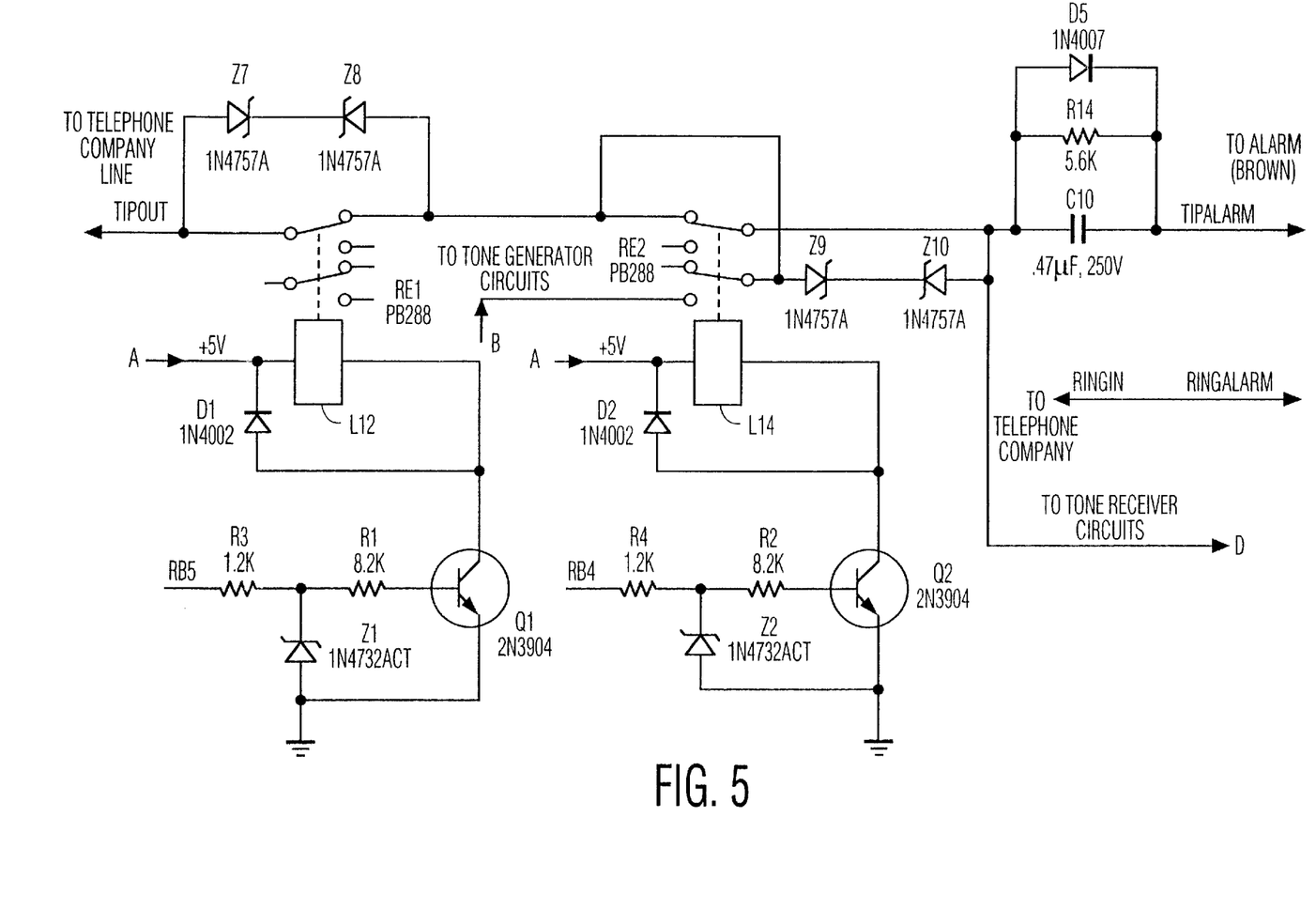

FIG. 5 depicts the switching elements, relays RE1 and RE2. Relay RE1 is used to return the line on-hook briefly to then re-establish dial tone when local loop current is re-established. Relay RE2 galvanically isolates the tip conductor of the local loop conductor pair of the incoming phone line from the alarm system. This interrupts the dialing process of the alarm system and allows the invention to dial another number without the dialing activity of the alarm system interfering with the process. The switching action of relay RE1 occurs when the logic state of the microcontroller U1 output pin RB5 swings from logic low "0" to the logic high state "1". This causes base current to flow in transistor Q1 through current limiting resistors R1 and R3. The establishment of base current causes Q1 to turn on, allowing current to flow through the coil 12 for energizing the relay RE1. Zener diode Z1 protects the microcontroller U1 output pin from voltage transients associated with coil deenergization. Diode D1 is an anti-kickback diode designed to clamp the collector voltage of Q1 to the supply rail during de-energization to prevent destructive high-voltage spiking from coil 12 that would otherwise occur. Back-to-back Zener diodes Z7 and Z8 are designed to limit the transient spikes on the local loop caused by the switching action of the relay RE1. The diodes Z7 and Z8 are wired across the normally closed contacts of the relay RE1, and, when these contacts open, allow loop current to decay slowly, thus avoiding the generation of high-voltage spikes on the line. Relay RE2 has identical drive components and topologies, and functions likewise, with Z9 and Z10 serving to limit transient spikes.

The diode D5 blocks DC current flow in the reverse direction, thus alerting the user to improper wiring of the system (tip-ring inversion), as household telephones will be rendered inoperative as long as this condition persists. Capacitor C10 and resistor R14 allow AC to bypass diode D5, allowing the ring signal to be substantially unaffected by the presence of this blocking diode D5.

Figure 6:
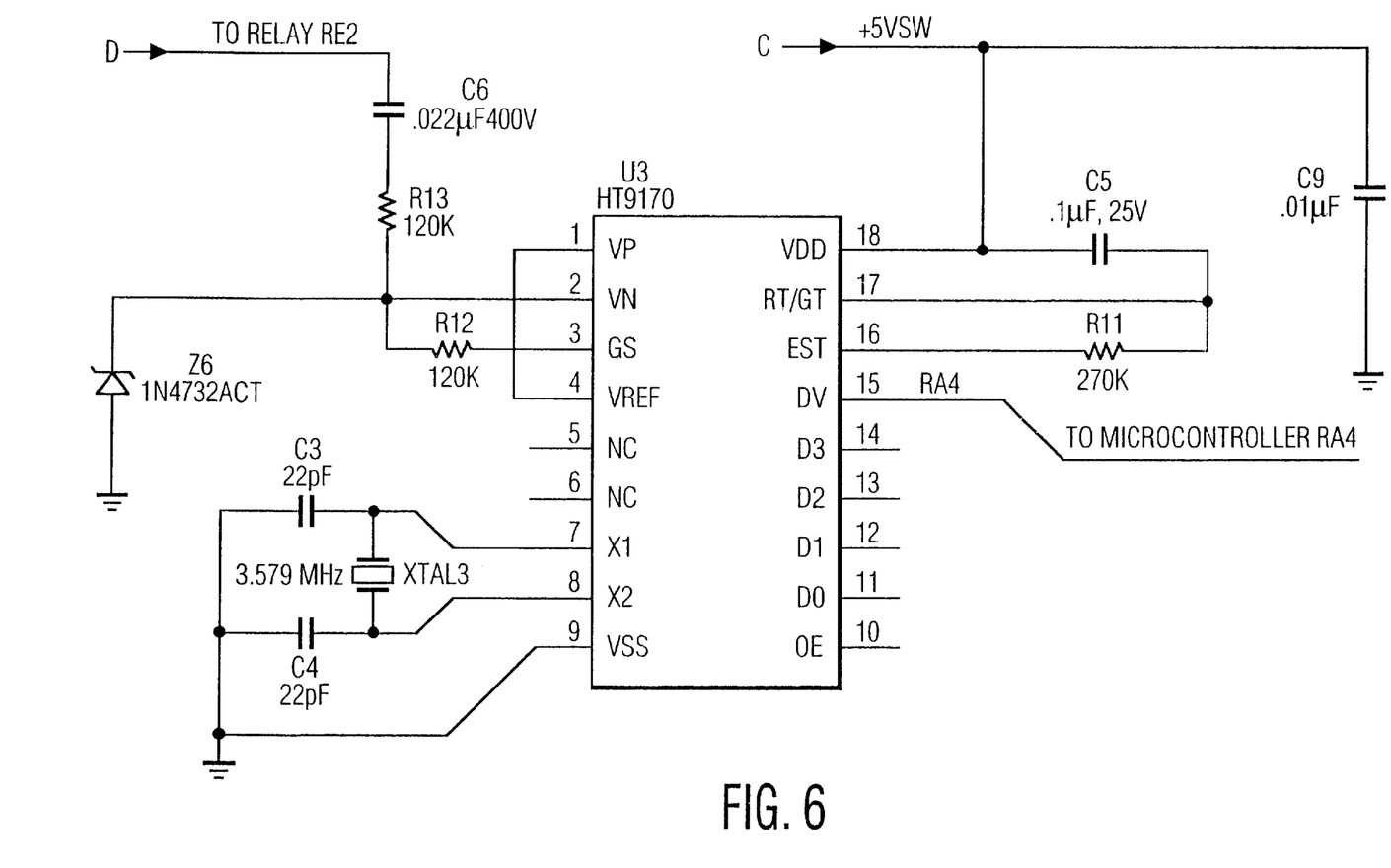

Integrated circuit U3 shown in FIG. 6 serves to detect DTMF tones. Operation of the circuit will not be described in detail here, as it is a commercial device and external components have been included as per the manufacturer's application notes, with the exception of Zener diode Z6, which has been included to protect the detector from excessive voltage imposed by the ring signal. The tip of the local loop conductor pair is capacitively coupled to the detector, and DV pin (Data Valid) output is routed to the input RA4 of microcontroller U1. This output will be logic high whenever any one of the sixteen valid DTMF tones is present on the phone line.

Figure 7:
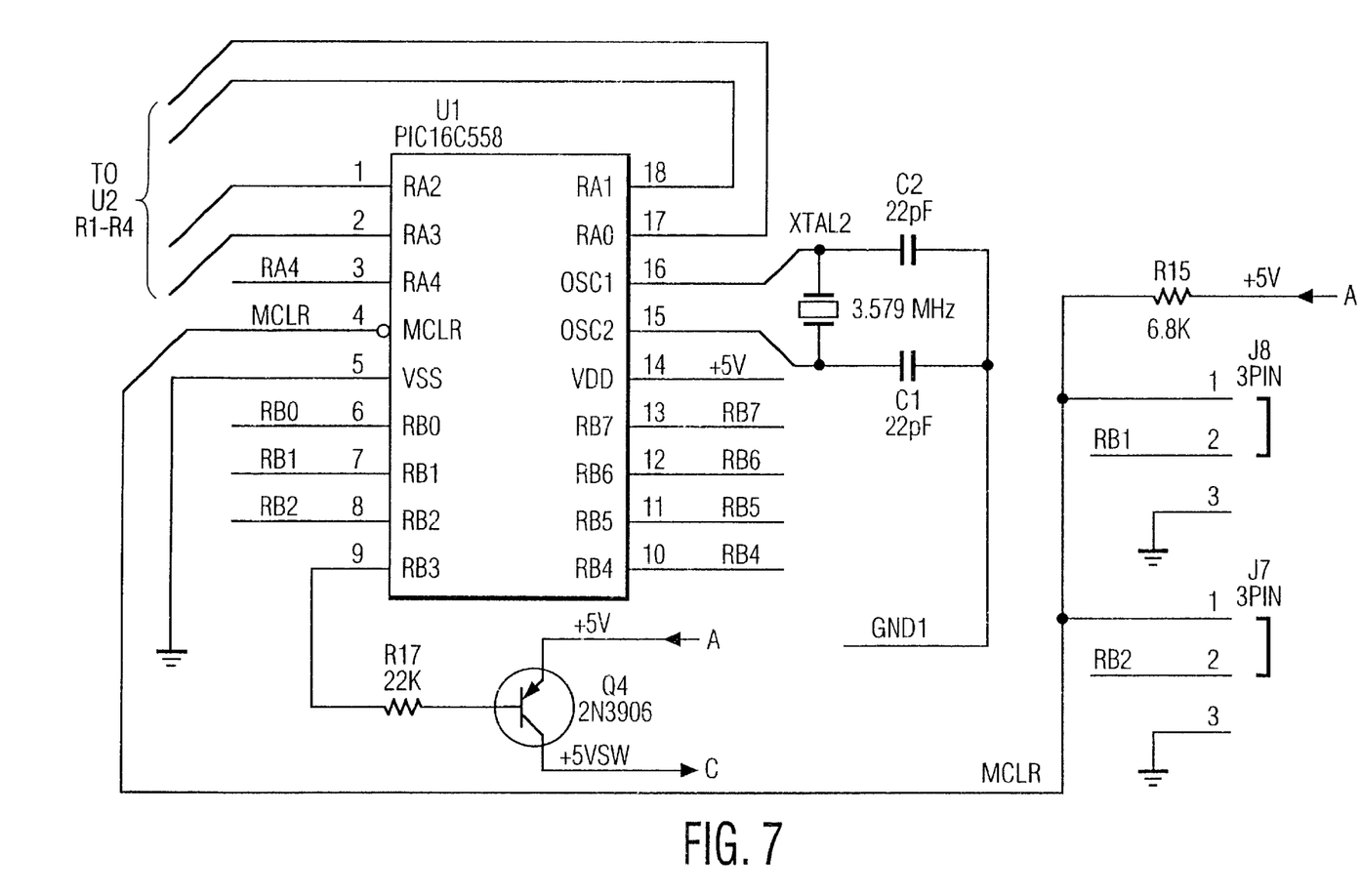
Figure 8A:
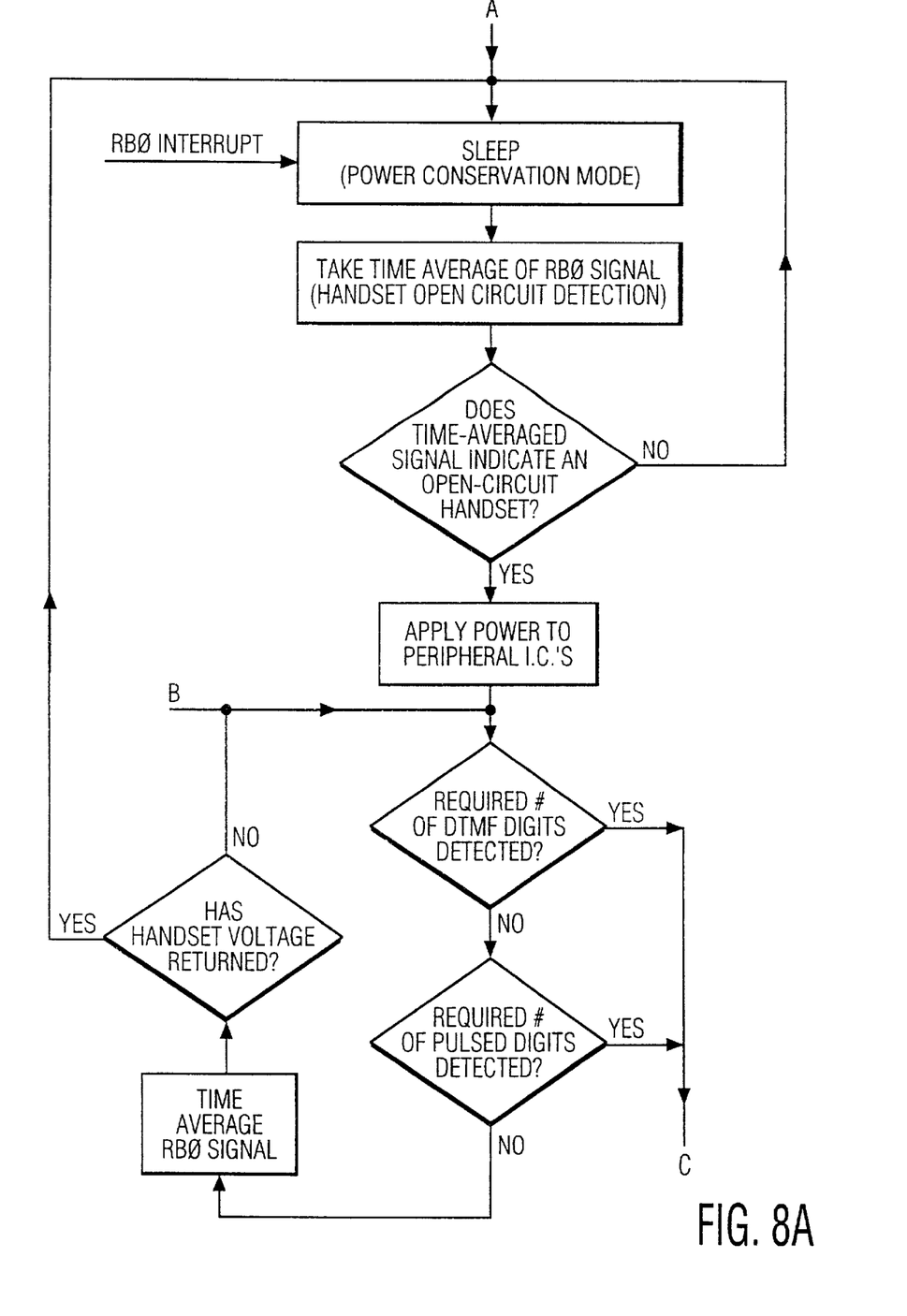
FIGS. 8A–8C collectively shows a flowchart illustrating operation of the present invention.
Figure 8B:
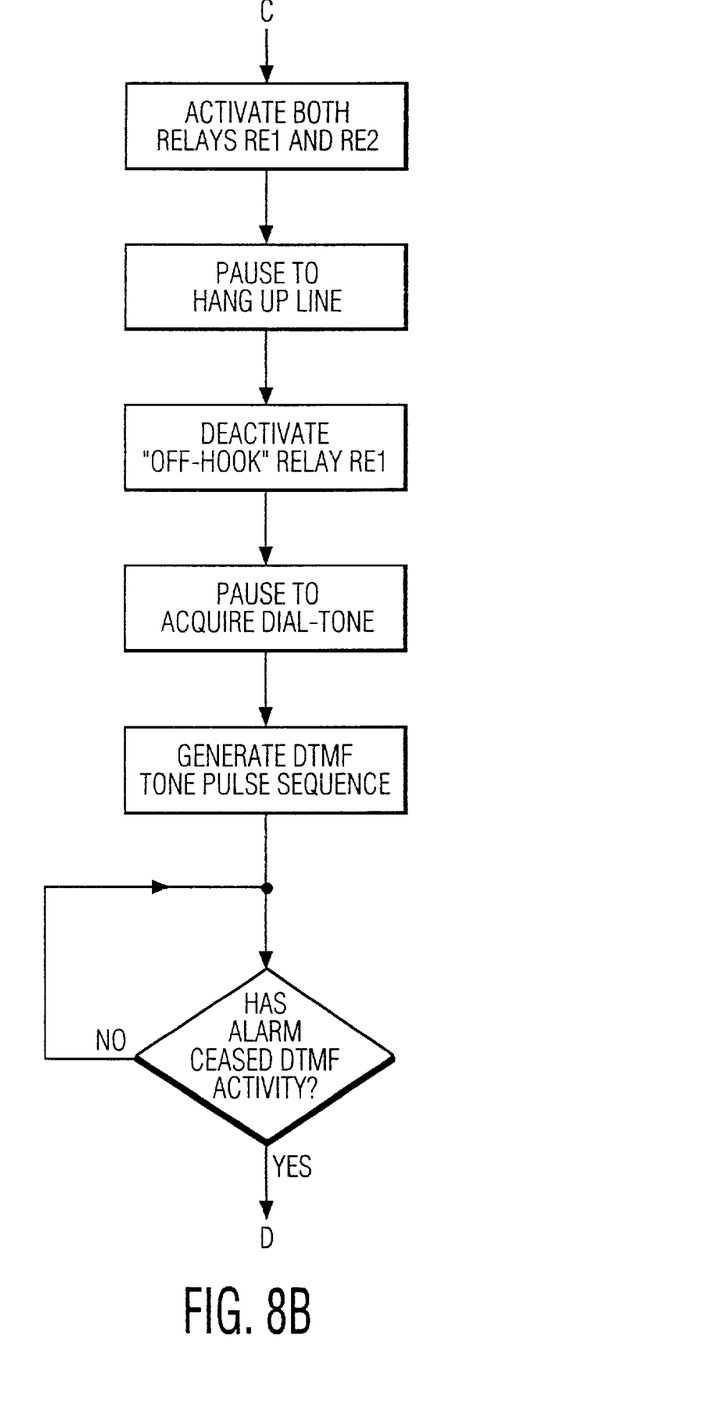
Figure 8C:
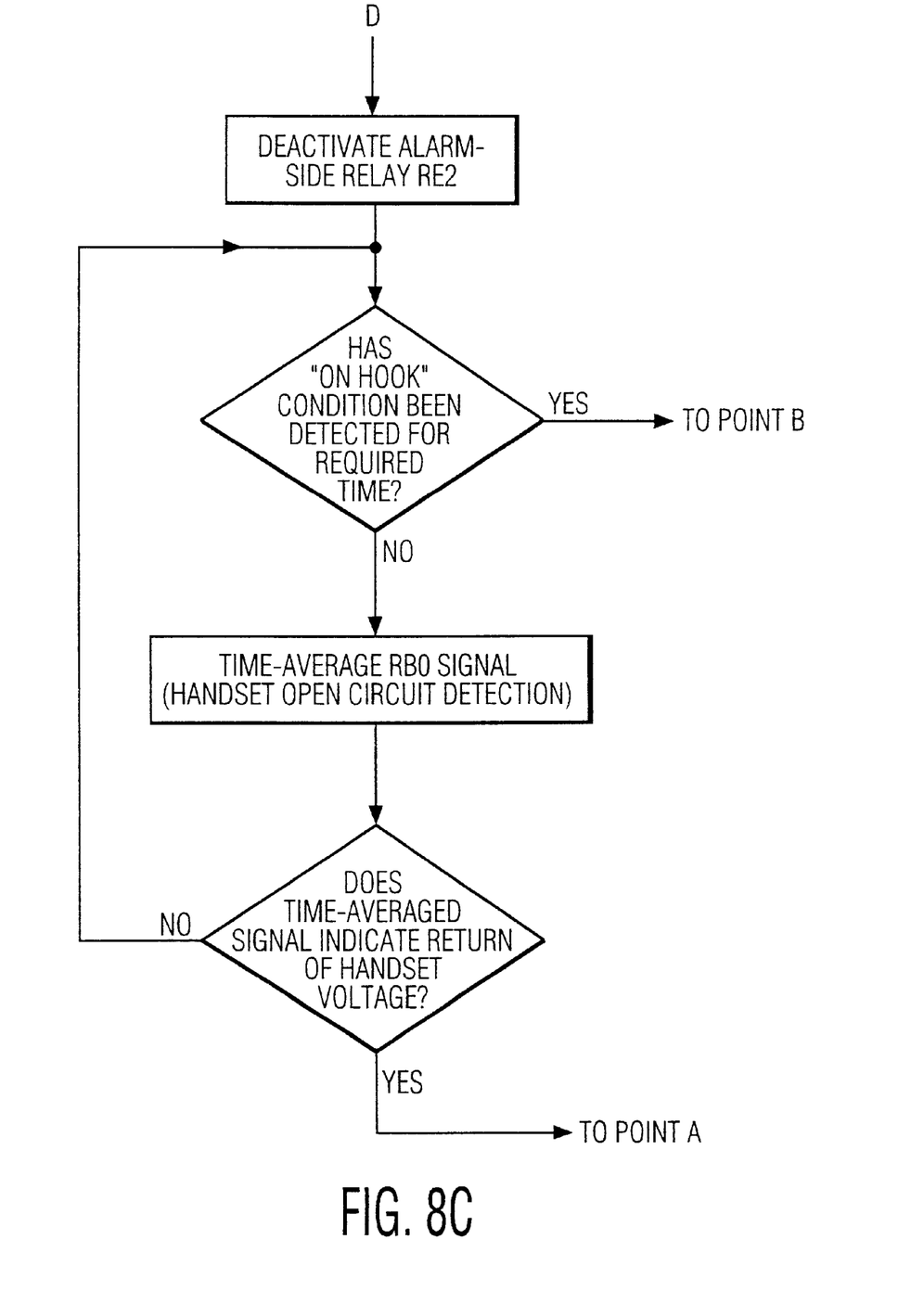

Integrated circuit U1 shown in FIG. 7 serves as the microcontroller of the device. It is this component where the software is stored and executed. Operation of the circuit will not be described in detail here, as it is a commercial device and external components have been included as per the manufacturer's application notes. Transistor Q4 allows the microcontroller U1 to have the ability to remove power from the peripheral IC chips (U2 and U3). Logic low on the RB3 output of U1 turns on the 5V rail to integrated circuits U1B, U2, and U3, and a logic high removes power. This feature allows standby power to the device to be very low (2 mA in the preferred embodiment). The jumpers J7 and J8 are used to select any one of four 11 digit pre-programmed telephone numbers to be dialed by the microcontroller U1. These jumpers control the logic state of two input pins of the microcontroller U1, with each penetration of this 2-bit binary word corresponding to a unique telephone number to be dialed. FIGS. 8A, 8B, and 8C show a flowchart for programming of microcontroller U1.

Although various embodiments of the invention have been shown and described, they are not meant to be limiting. Those of skill in the art may recognize certain modifications to these embodiments, which modifications are meant to be covered by the spirit and scope of the appended claims.

What is claimed is:

1. A device for connection between a telephone line and an existing alarm system to reroute an alarm report through the telephone line, from a preprogrammed central it monitoring station of the existing alarm system to a desired central monitoring station, said device comprising:
    a detector for detecting activation of the existing alarm system through the telephone line, for generating an initiating signal;
    a microprocessor responsive to the initiating signal for outputting a switch signal and a dial signal;
    a switch responsive to the switch signal for reversibly isolating the existing alarm system from the telephone line; and
    a dialer connected to the telephone line and responsive to said dial signal for dialing a telephone number of the desired central monitoring station on said telephone line, whereupon the switch reconnects the existing alarm system to the telephone line to implement rerouting of the alarm report from the existing alarm system.

2. The device of claim 1, wherein said microprocessor includes:
    a programmable memory means for storing a plurality of telephone numbers, and a set of programmable instructions for implementing operation of said microprocessor; and
    selecting means operatively associated with the memory means for selecting one of the plurality of telephone numbers to be used for dialing a desired central monitoring station.

3. The device of claim 1, wherein:
    the detector being further adapted for detecting a voltage change across a telephone handset line connected to the existing alarm system and the presence of dialing activity of said existing alarm system on the telephone line; and
    the switch being further adapted for momentarily returning the telephone line to an on-hook condition to re-establish a dial tone prior to activation of the dialer.

4. The device of claim 1, further including:
    power supply means for providing electrical power to said device, said power supply means including a rechargeable battery recharged by power from said telephone line during a standby mode of operation.

5. The device of claim 4, wherein said switch includes:
    a first relay operable for hanging up said telephone line; and
    a second relay operable for isolating the existing alarm system from said telephone line.

6. The device of claim 1, wherein said dialer includes a dual-tone multiple frequency generator with input means connected to said microprocessor for receiving the dial signal from the microprocessor to implement dialing of the telephone number of the desired central monitoring station.

7. The device of claim 1, wherein said detector includes:
    a handset isolation detector means for discriminating normal operating handset line condition and isolated handset line condition on a telephone handset line connected to the alarm system;
    a loop current detector means for detecting one of on-hook and off-hook current conditions and pulse dialing activity on the telephone line; and
    a tone detector means for detecting one of sixteen valid dual-tone multiple frequency tones on said telephone line.

8. In an alarm system, a method for rerouting alarm reports from a previously programmed central monitoring station to a desired central monitoring station without reprogramming the alarm system, said method comprising the steps of:
    detecting the isolation of a telephone handset line;
    detecting the dialing activity of the alarm system;
    activating a first switching means for hanging up an associated telephone line;
    deactivating said first switching means to create an off-hook condition to re-acquire dial tone on said telephone line;
    activating a second switching means for isolating the alarm system from said telephone line to prevent interruption by said alarm system as it may continue to dial its previously programmed central monitoring station;
    generating DTMF or pulse dialing sequence signals while confirming no dialing activity by the alarm system; and
    deactivating said second switching means, in response to cessation of dialing activity by the alarm system, to reconnect the alarm system to said telephone line to permit the transfer of data from said alarm system to said desired central monitoring station.

9. The method of claim 8, wherein said detecting isolation of a telephone handset line step includes the step of:
    measuring the time average of a voltage drop across said telephone handset line.

10. The method of claim 8, wherein said detecting dialing activity step includes the steps of:
    counting a threshold number of DTMF digits or pulse dialing digits.

11. The method of claim 8, further including the steps of:
    detecting an on-hook condition for a predetermined amount of time;
    detecting dialing activity of said alarm system; and
    resetting a microprocessor controller programmed to carry out said steps.

12. The method of claim 8, further including the steps of:
    detecting line voltage across said handset line for a continuous predetermined amount of time; and
    switching a microprocessor controller programmed to carry out said steps to a standby mode.

* * * * *

(12) EX PARTE REEXAMINATION CERTIFICATE (9156th)
United States Patent
Webb (10) Number: US 6,366,647 C1
(45) Certificate Issued: Jul. 31, 2012

(54) ALARM REPORT CALL REROUTER (75) Inventor: Richard S Webb, Brick, NJ (US)

(73) Assignee: Unicon Monitoring, LLC, Toms River, NJ (US)

Reexamination Request:
No. 90/011,978, Oct. 21, 2011

Reexamination Certificate for:
Patent No.: 6,366,647
Issued: Apr. 2, 2002
Appl. No.: 09/304,036
Filed: May 3, 1999

(51) Int. Cl.
H04M 11/00 (2006.01)

(52) U.S. Cl. .................................. 379/40; 379/106.08
(58) Field of Classification Search .................. None
See application file for complete search history.

(56) References Cited

To view the complete listing of prior art documents cited during the proceeding for Reexamination Control Number 90/011,978, please refer to the USPTO's public Patent Application Information Retrieval (PAIR) system under the Display References tab.

Primary Examiner — Ovidio Escalante (57) ABSTRACT

A device for rerouting the report call of an alarm system to another telephone number through the interruption of the alarm system's out-dialing process, includes two electronically controlled switching devices that allow the device to momentarily isolate the alarm from the phone line. Switches are operated under microprocessor control, for causing dialing of the new phone number by the generation of DTMF tones by a DTMF generator operating under microprocessor control. Triggering of the report call rerouting process is keyed to the presence of two conditions: one being loss of voltage from the handset lines, and the other being presence of dialing activity, either DTMF tones or pulse-dialing pulses on the telephone line. The device will reset itself after the telephone has been held in the on-hook condition for a predetermined interval by the alarm system, to allow the device to reroute subsequent report call attempts if initial attempts to connect are unsuccessful.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

Claims 2-12 were not reexamined.

* * * * *